United States Patent [19]

Horsley

[11] Patent Number: 4,645,089
[45] Date of Patent: Feb. 24, 1987

[54] ADJUSTABLE OUTLET BOX MOUNTING

[75] Inventor: Larry L. Horsley, Lithia Springs, Ga.

[73] Assignee: Martha Willene Horsley, Lithia Springs, Ga.

[21] Appl. No.: 725,949

[22] Filed: Apr. 22, 1985

Related U.S. Application Data

[63] Continuation-in-part of Ser. No. 524,571, Aug. 19, 1983, Pat. No. 4,569,458.

[51] Int. Cl.⁴ .............................................. H02G 3/08
[52] U.S. Cl. .................................... 220/3.6; 220/3.9; 248/27.1; 248/DIG. 6
[58] Field of Search ............ 248/27.1, 205.1, DIG. 6; 220/3.3, 3.4, 3.6, 3.7, 3.9

[56] References Cited

U.S. PATENT DOCUMENTS

| | | | |
|---|---|---|---|
| 1,066,706 | 7/1913 | Caine | 220/3.4 |
| 1,206,431 | 11/1916 | Graybill | 220/3.4 |
| 1,705,768 | 3/1929 | Johnson et al. | 220/3.4 |
| 1,779,681 | 10/1930 | Smith et al. | 248/DIG. 6 X |
| 2,252,953 | 8/1941 | Walters | 220/3.4 X |
| 2,299,674 | 10/1942 | Austin | 248/DIG. 6 X |
| 2,299,696 | 10/1942 | Gregersen | 248/DIG. 6 X |
| 2,399,491 | 4/1946 | Lindstrom | 220/3.6 |
| 2,423,757 | 7/1947 | Dedge | 220/3.9 |
| 3,767,151 | 10/1973 | Seal et al. | 248/205.1 |
| 3,908,074 | 9/1975 | Berg | 220/3.9 X |
| 4,000,874 | 1/1977 | Finley et al. | 248/27.1 |
| 4,057,164 | 11/1977 | Maier | 220/3.6 |
| 4,135,337 | 1/1979 | Medlin | 220/3.6 X |
| 4,296,870 | 10/1981 | Balkwill et al. | 220/3.3 |
| 4,399,922 | 8/1983 | Horsley | 248/DIG. 6 X |
| 4,447,030 | 5/1984 | Nattel | 248/27.1 |
| 4,569,458 | 2/1986 | Horsley | 248/DIG. 6 X |
| 4,572,391 | 2/1986 | Medlin | 220/3.9 |
| 4,603,789 | 8/1986 | Medlin | 220/3.9 |

Primary Examiner—Reinaldo P. Machado
Assistant Examiner—David M. Purol
Attorney, Agent, or Firm—Newton, Hopkins & Ormsby

[57] ABSTRACT

An electrical outlet box is rendered adjustable forwardly and rearwardly on a mounting bracket through which the outlet box is secured to an adjacent wall stud. The forward and rearward adjustment of the outlet box is accomplished in one embodiment of the invention through the use of slotted plaster ears through which the box is connected to the mounting bracket. In a second embodiment, the outlet box receives side wall mounting screws which can be adjusted with the box forwardly and rearwardly relative to the mounting bracket before the screws are caused to penetrate an extension of the mounting bracket.

9 Claims, 7 Drawing Figures

ADJUSTABLE OUTLET BOX MOUNTING

CROSS-REFERENCE TO RELATED APPLICATION

This application is a continuation-in-part of prior copending application Ser. No. 06/524,571, filed Aug. 19, 1983, now U.S. Pat. No. 4,569,458, for MOUNTING FOR ELECTRICAL OUTLET BOX.

BACKGROUND OF THE INVENTION

One object of this invention is to improve upon the outlet box mounting shown in U.S. Pat. No. 4,399,922 of which the above-referenced application was a continuation-in-part.

More particularly, it is an object of the present invention to eliminate the need for using the dry wall ring shown in the above patent.

Another object of the present invention is to provide in an outlet box mounting a convenient and economical means to adjust the outlet box somewhat forwardly and rearwardly of a stud attached mounting bracket to accommodate varying dry wall thicknesses. According to the invention, this adjusting means can take the form of upper and lower plaster ears or brackets through which the outlet box is adjustably secured within an opening formed in the front wall of an L-shaped mounting bracket which is secured to an adjacent wall stud.

The adjusting means for the outlet box may also be in the form of self-tapping mounting screws for the box which, after placement through side wall openings of the box, are bodily adjusted with the box forwardly or rearwardly depending upon dry wall thickness, before causing the self-tapping screws to penetrate through a rearwardly extending spacing or stabilizing extension of the box mounting bracket which is attached to a wall stud.

The mounting arrangement according to this invention enables the use of outlet boxes of varying lengths in the front-to-rear direction employing either the above-mentioned plaster ears or the self-tapping mounting screws by attaching the outlet box to the stud-attached mounting bracket.

Other features and advantages of the invention will become apparent to those skilled in the art during the course of the following description.

DETAILED DESCRIPTION

Figure 1:
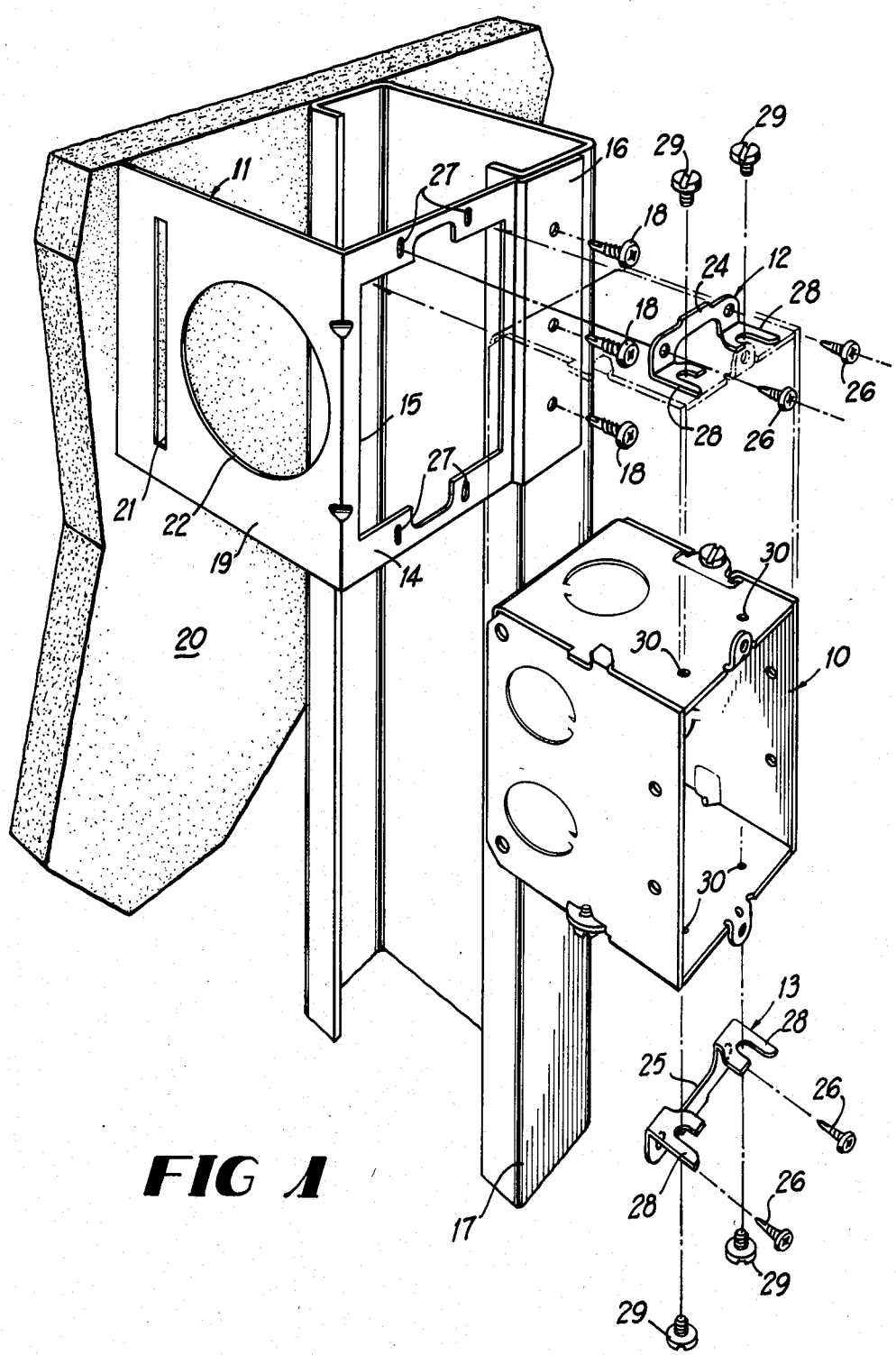
FIG. 1 is an exploded perspective view of an outlet box mounting and adjusting means according to one embodiment of the invention.
Figure 2:
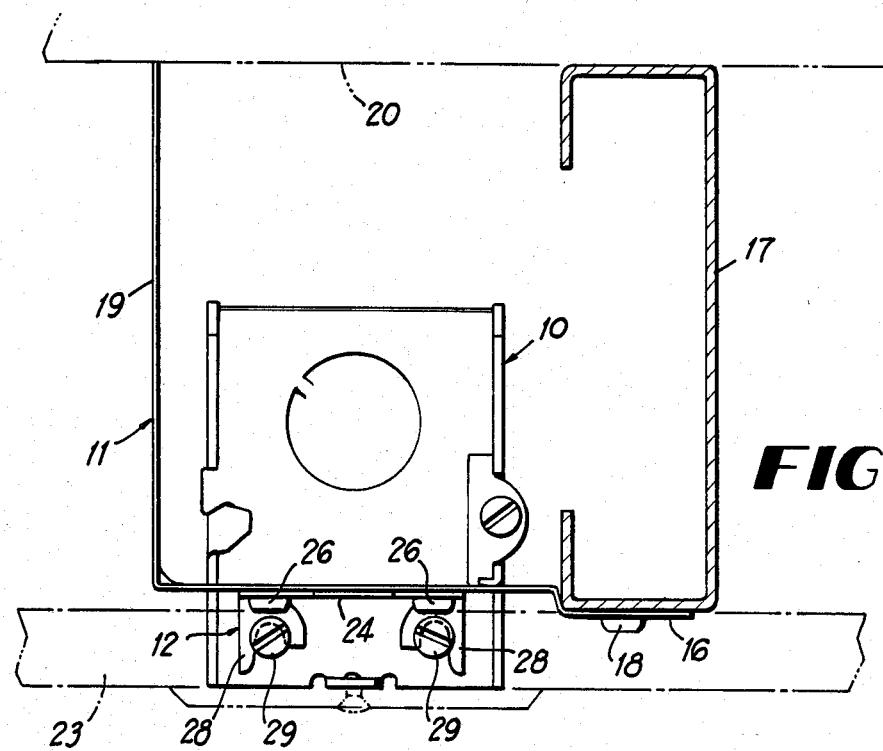
FIG. 2 is a plan view of the outlet box mounting in FIG. 1, partly in section.
Figure 3:
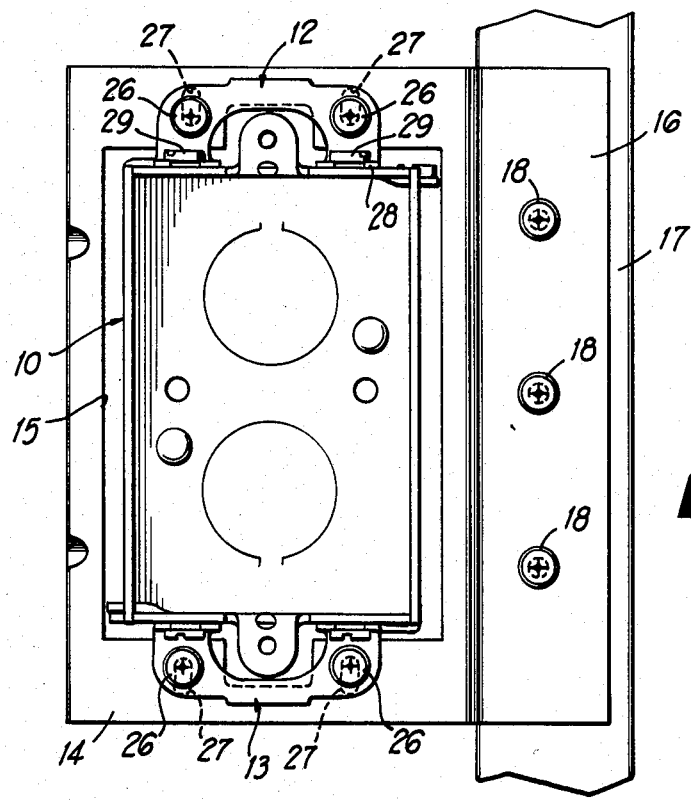
FIG. 3 is a front elevation of the outlet box mounting.

Referring to the drawings in detail wherein like numerals designate like parts, and referring initially to FIGS. 1-3 showing a first embodiment of the invention, an outlet box 10 of conventional construction is secured adjustably to an outlet box mounting bracket 11 by upper and lower plaster ears 12 and 13. The mounting bracket 11 includes a front vertical panel 14 having a receptor opening 15 for the outlet box 10 and a somewhat forwardly offset end extension 16 secured to the forward face of a wall stud 17 at the desired height by screws 18. A right angular stabilizing extension panel 19 of the mounting bracket 11 extends rearwardly from the front panel 14 and engages a dry wall section 20 at the rear face of the stud 17 for stabilizing the mounting bracket. Near its rear end, the stabilizing extension 19 has a narrow vertical slot 21 to facilitate bending or cutting off the rear portion of the panel 19 in order to adjust the front-to-rear length of the panel 19 to fit walls of different thicknesses. The panel 19 also contains an opening 22 through which wiring may conveniently pass.

In accordance with an important aspect of the invention, the two plaster ears 12 serve the dual purpose of attaching the outlet box 10 to the front panel 14 of mounting bracket 11 and also serving as a front-to-rear horizontal adjusting means for the box 10 so that the outlet box may have its forward, open end arranged flush with the front face of the other dry wall section 23 of the wall. The arrangement of the plaster ears 12 eliminates the customary dry wall ring of the prior art which is more expensive and less convenient to install.

The two plaster ears 12 and 13 have their vertical portions 24 and 25 secured by screws 26 to the panel 14 which has slots 27 near its top and bottom edges. The two horizontal arms 28 of the plaster ears have adjusting slots which are forwardly open. Screws 29 engage through these slots of the plaster ears and are received through openings 30 in the top and bottom walls of the outlet box 10. By this described means, the outlet box is securely held on the mounting bracket 11 within its opening 15 and is rendered adjustable forwardly and rearwardly, as stated. The box 10 is centered within the opening 15, FIG. 3. The mounting arrangement is simple, economical and convenient to install and adjust.

Figure 5:
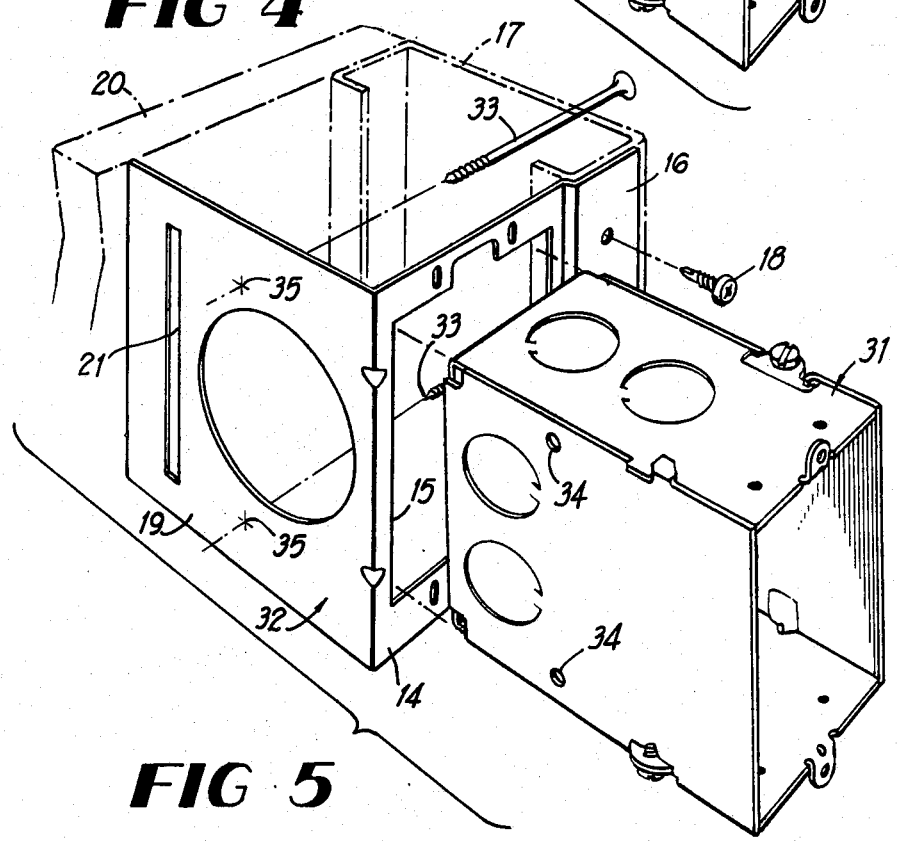
FIG. 5 is a similar view of the alternative embodiment of the invention in greater detail and depicting a longer outlet box and a mounting bracket having a longer front-to-back stabilizing extension.
Figure 6:
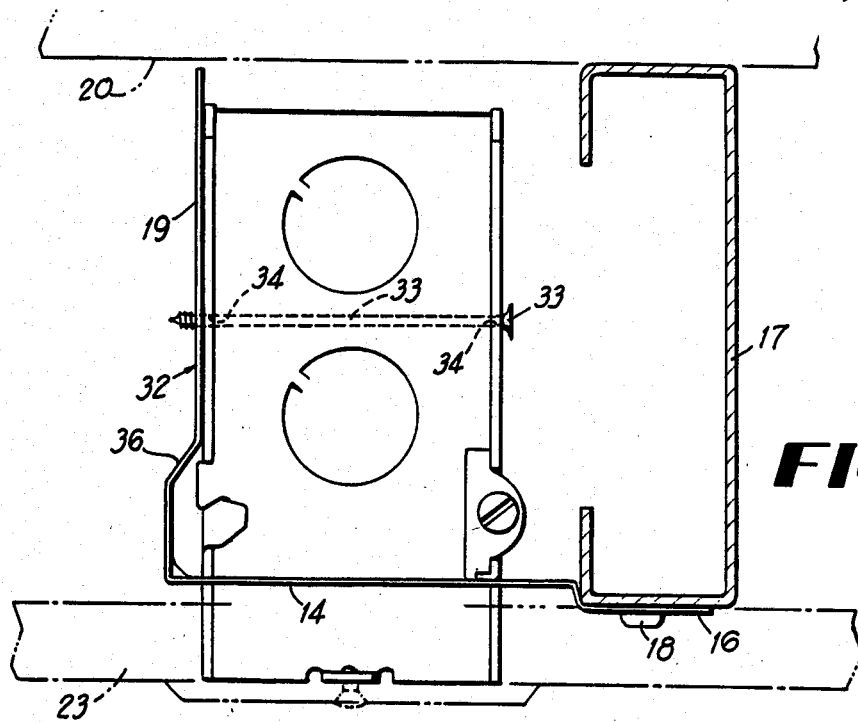
FIG. 6 is a plan view of the outlet box mounting shown in FIG. 5 following the tightening of self-tapping screws which attach the box to its mounting bracket.
Figure 7:
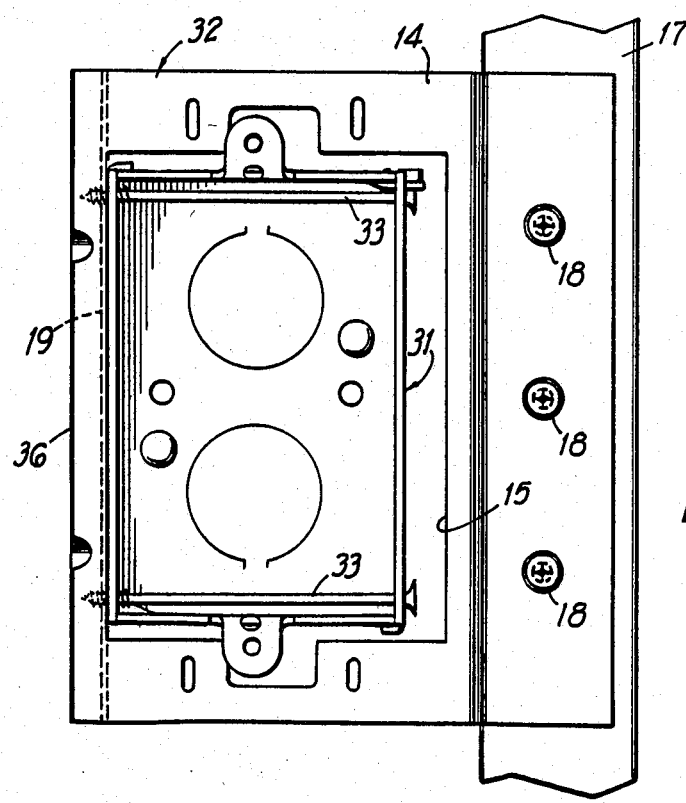
FIG. 7 is a front elevation of the box mounting shown in FIG. 6.

FIGS. 5-7 show an alternative embodiment of the invention in which a different means is employed for the dual purpose of attaching an outlet box 31 to the L-shaped mounting bracket 32 and rendering the box 31 adjustable horizontally forwardly or rearwardly at the time of its installation. The box 31 is of a longer style than the box 10 in the front-to-rear direction. The mounting bracket 32 is identical to the previously-described bracket 11.

In lieu of the plaster ears 12 and 13, a pair of long self-tapping screws 33 is received through vertically spaced side wall openings 34 of the outlet box 31 somewhat forwardly of its rear end. Before installing the mounting bracket 32 on the stud 17 exactly as described in the prior embodiment, the outlet box 31 with the two screws 33 placed in the side wall openings 34 is merely inserted through the opening 15 to the required depth in the front-to-back direction to render the front of the box flush with the adjacent dry wall 23, FIG. 6. When this adjustment has been made, the two self-tapping screws 33 are turned causing them to penetrate the adjacent stabilizing panel 19 of the mounting bracket at the points 35, FIG. 5, and this completes the adjustment and securing of the box 31 to the bracket 32 in one quick and easy operation. Like the plaster ears 12 and 13, the two screws 33 comprise a means to secure the outlet box to the mounting bracket 32, and a means to adjust the outlet box in the front-to-rear horizontal direction to accommodate dry wall of varying thicknesses.

As shown in FIGS. 6 and 7, when the screws 33 are tightened, the box 31 will engage one edge of the opening 15 and can move no further to the left, as shown in FIG. 7. Therefore, continued tightening of the screws 33 will draw the stabilizing panel 19 into contact with the adjacent box side wall, FIG. 6, and the bracket 32 will become deformed during the screw-tightening operation as shown at 36 in FIG. 6. The installed outlet box 31 will be off center in the opening 15 and permanently in contact with the panel 19 and the adjacent edge of the opening 15 to create a very solid mounting for the outlet box.

Figure 4:
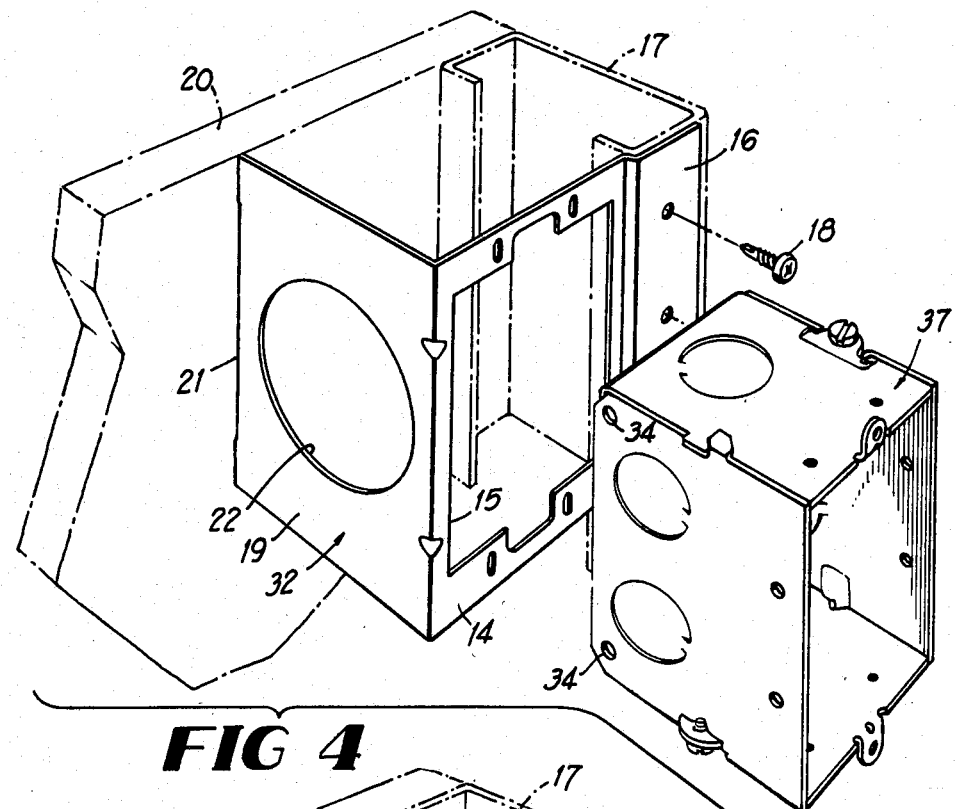
FIG. 4 is an exploded perspective view of an outlet box mounting according to an alternative embodiment of the invention.

In FIG. 4, a shorter style box 37 is illustrated although the arrangement can accept longer or shorter outlet boxes as needed. The stabilizing panel 19 in FIG. 4 is also shown trimmed at the slot 21.

The box 37 can be installed with the plaster ears 12 and 13, not shown in FIG. 4, or by means of self-tapping screws, such as the screws 33, which screws are omitted in FIG. 4 for simplicity of illustration.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An adjustable outlet box mounting comprising a mounting bracket adapted for attachment to a vertical wall stud and including a front panel having an opening to receive an outlet box, said mounting bracket comprising an L-shaped bracket having a rearwardly extending stabilizing panel secured to said front panel and extending rearwardly therefrom and being adapted to contact the interior face of a rear dry wall section at the rear face of the vertical wall stud, an outlet box for placement in said opening, and means connected with the outlet box near its top and bottom for attaching the outlet box to said mounting bracket and for enabling horizontal adjustment of the outlet box in a front-to-rear direction at the time of installation of the box so that the front of the box will be substantially flush with a dry wall section at the front face of the stud to which the mounting bracket is attached.

2. An adjustable outlet box mounting as defined in claim 1, and said stabilizing panel having a vertical slot near the rear end of the stabilizing panel extending for the major portion of the height of the stabilizing panel, whereby such panel can be bent or trimmed at said slot to adjust the length of said panel.

3. An adjustable outlet box mounting as defined in claim 1, and said means comprising a pair of plaster ears at the top and bottom of the outlet box and being secured to said front panel adjacent to the top and bottom of the opening of the front panel and being adjustably secured to top and bottom walls of the outlet box.

4. An adjustable outlet box mounting as defined in claim 3, and said plaster ears including vertical portions which are secured to the front panel of said mounting bracket and horizontal bifurcated portions which are secured adjustably to said top and bottom walls of the outlet box by screws engaged in the top and bottom walls of the outlet box and engaged adjustably with said bifurcated portions.

5. An adjustable outlet box mounting as defined in claim 1, and said means comprising a pair of vertically spaced horizontal screws received through side wall openings of the outlet box and being adjustable with the outlet box in said front-to-rear direction, and said screws being adapted to penetrate an adjacent part of the mounting bracket.

6. An adjustable outlet box mounting as defined in claim 5, and the mounting bracket comprising an L-shaped bracket having a rearwardly extending stabilizing panel secured to said front panel and extending rearwardly therefrom, said screws penetrating said stabilizing panel at vertically spaced points thereon following the front-to-rear adjusting of the outlet box.

7. An outlet box mounting comprising a mounting bracket adapted for attachment to a wall stud and having a front panel and an outlet box opening, said mounting bracket comprising an L-shaped bracket having a rearwardly extending stabilizing panel secured to said front panel and extending rearwardly therefrom and being adapted to contact the interior face of a rear dry wall section at the rear face of the vertical wall stud, an outlet box adapted to be placed in said opening, and means connected with the outlet box near its top and bottom for attaching the outlet box to said mounting bracket, said means also enabling front-to-rear horizontal adjustment of the outlet box within said opening, and said means including screw-threaded parts threadedly engaging the mounting bracket.

8. A method for anchoring an outlet box having a side wall opening to a mounting bracket adapted for attachment to a vertical wall stud and including a front panel having a panel opening to receive said outlet box, said mounting bracket comprising an L-shaped bracket having a rearwardly extending stabilizing panel secured to said front panel and extending rearwardly therefrom and adapted to contact the interior face of a rear dry wall section, comprising the steps of:
 a. positioning said outlet box in said panel opening at a desired depth;
 b. inserting a self tapping screw into said side wall opening so that the point of said screw is against said stabilizing panel;
 c. turning said screw so that said screw penetrates the stabilizing panel.

9. The method defined in claim 8 including the additional step of attaching said front panel to the vertical wall stud.

* * * * *